United States Patent
Liang et al.

(10) Patent No.: US 9,720,765 B2
(45) Date of Patent: Aug. 1, 2017

(54) SYSTEMS AND METHODS FOR APPLICATION CRASH MANAGEMENT

(71) Applicant: Facebook, Inc., Menlo Park, CA (US)

(72) Inventors: Xiaojun Liang, San Jose, CA (US); Xin Liu, Belmont, CA (US); Parthiv Bharatbhai Patel, Los Altos, CA (US); Maher Afif Saba, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 106 days.

(21) Appl. No.: 14/971,827

(22) Filed: Dec. 16, 2015

(65) Prior Publication Data

US 2017/0177433 A1   Jun. 22, 2017

(51) Int. Cl.
*G06F 11/00* (2006.01)
*G06F 11/07* (2006.01)

(52) U.S. Cl.
CPC ...... *G06F 11/0793* (2013.01); *G06F 11/0706* (2013.01); *G06F 11/076* (2013.01); *G06F 11/079* (2013.01)

(58) Field of Classification Search
CPC .. G06F 11/34; G06F 11/3438; G06F 11/3409; G06F 11/3452; G06F 11/3466; G06F 11/3476; G06F 11/349
See application file for complete search history.

(56) References Cited

U.S. PATENT DOCUMENTS

2013/0159497 A1*  6/2013  Butler ............... G06F 21/6218
                                                          709/224

* cited by examiner

*Primary Examiner* — Bryce Bonzo
*Assistant Examiner* — Katherine Lin
(74) *Attorney, Agent, or Firm* — Sheppard, Mullin, Richter & Hampton LLP

(57) ABSTRACT

Systems, methods, and non-transitory computer-readable media can determine an application feature causing an application to crash. A set of users is ranked based on application data. The application data comprises crash cause data indicative of the number of times the application feature caused the application to crash for a user. A high crash user group is determined based on the ranking the set of users. The application feature is disabled for the high crash user group. A subset of the high crash user group is periodically replaced with a set of new users not currently in the high crash user group.

20 Claims, 7 Drawing Sheets

SYSTEMS AND METHODS FOR APPLICATION CRASH MANAGEMENT

FIELD OF THE INVENTION

The present technology relates to the field of social networks. More particularly, the present technology relates to application crash management.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users of a social networking system can access the social networking system using various applications on various user devices. For example, a user can access the social networking system using a native web application on the user's laptop or desktop computer, and can also access the social networking system using a mobile application on the user's mobile device. Social networking systems value these various applications because they allow users to access social networking systems at various times and from various locations, thereby increasing potential user engagement.

SUMMARY

Various embodiments of the present disclosure can include systems, methods, and non-transitory computer readable media configured to determine an application feature causing an application to crash. A set of users is ranked based on application data. The application data comprises crash cause data indicative of the number of times the application feature caused the application to crash for a user. A high crash user group is determined based on the ranking the set of users. The application feature is disabled for the high crash user group. A subset of the high crash user group is periodically replaced with a set of new users not currently in the high crash user group.

In an embodiment, the subset of the high crash user group that is periodically replaced is randomly selected.

In an embodiment, the set of new users is equal in number to the subset of the high crash group.

In an embodiment, an updated set of users that are not in the high crash user group is re-ranked base on application data. The set of new users is selected based on the re-ranking the updated set of users.

In an embodiment, a user cannot be removed from the high crash user group if the user has not been in the high crash user group for a minimum period of time.

In an embodiment, a user cannot be added to the high crash user group if the user has not been outside the high crash user group for a minimum period of time.

In an embodiment, the crash cause data is indicative of the number of times the application feature caused the application to crash for a user over a predetermined period of time.

In an embodiment, the size of the high crash user group is defined by a percentage of an overall user population.

In an embodiment, the application feature is an in-app browser.

In an embodiment, deactivating the in-app browser causes web content to be opened in an external browser.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
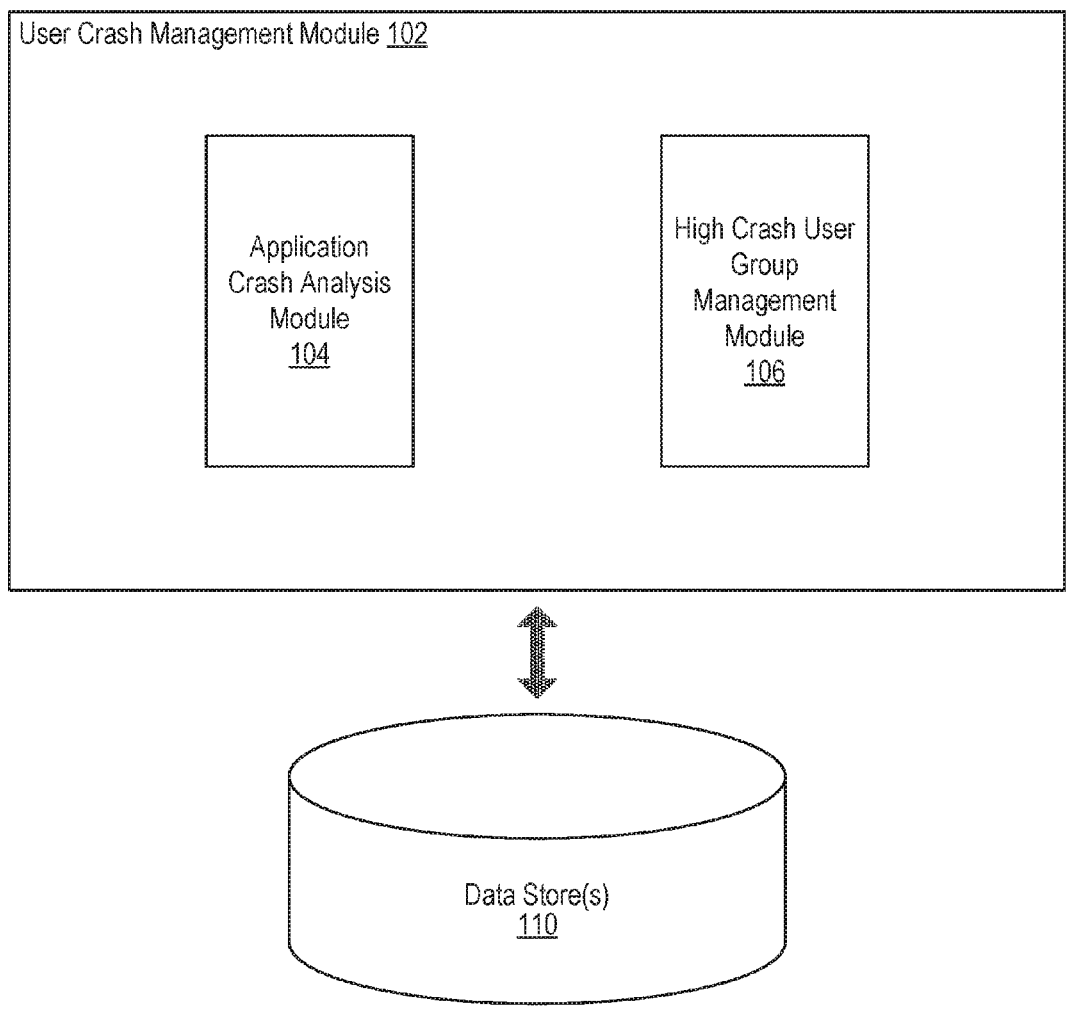
FIG. 1 illustrates an example system including a user crash management module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Social Network User Crash Management

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (i.e., a social networking service, a social network, etc.). For example, users can add friends or contacts, provide, post, or publish content items, such as text, notes, status updates, links, pictures, videos, and audio, via the social networking system.

Users of a social networking system can access the social networking system using various applications on various user devices. For example, a user can access the social networking system using a native web application on the user's laptop or desktop computer, and can also access the social networking system using a mobile application on the user's mobile device. Social networking systems value these various applications because they allow users to access social networking systems at almost any time and from almost any location, thereby increasing potential user engagement.

It continues to be an important interest for a social networking system to provide an engaging and hassle-free experience on any application associated with the social networking system, whether it is a native web application, a mobile application, or other application. However, it is an unavoidable truth that software applications will experience occasional bugs, glitches, and crashes. While every measure can be taken to ensure as few problems as possible, it is impractical to test for every possible scenario. This is especially true given the diversity of user devices available, and the numerous features incorporated into social networking system applications. Even in scenarios where it is possible to pinpoint the particular feature that caused a user's application to glitch or crash, it is often the case that the problem is isolated to a small group of users relative to the overall user population, and it would be counterproductive or unnecessary to allocate significant resources to address an issue that affects only a small percentage of users.

An improved approach rooted in computer technology overcomes the foregoing and other disadvantages associated with conventional approaches specifically arising in the realm of computer technology. Based on computer technology, the disclosed technology can determine one or more features causing an application to crash, and disable that feature for a group of users that experience frequent crashes due to the particular feature. In various embodiments, application data is kept to determine the users that most often experience crashes due to a particular feature. Users who experience the most crashes are placed in a high crash user group. Users in the high crash user group have the troublesome feature disabled or removed from their applications so as to decrease the frequency of crashing, thereby improving user experience. In particular embodiments, the feature is related to an in-app browser that is used to view web content within a social networking application. For those users that most often have their social networking application crash due to the in-app browser, the in-app browser is turned off and an external browser is utilized to open web content. In various embodiments, the high crash user group is periodically updated by periodically rotating users in and out of the high crash user group. For example, a subset of users in the high crash user group can be periodically removed from the high crash user group, and another group of users who experience frequent crashes can be moved into the high crash user group to replace the removed users.

FIG. 1 illustrates an example system 100 including an example user crash management module 102 configured to manage user applications, according to an embodiment of the present disclosure. The user crash management module 102 can be configured to analyze application data to determine which users experience application crashes most often. In various embodiments, the application data can also include the cause of the application crash, such that users who experience frequent crashing due to a particular application feature can be grouped together. The user crash management module 102 can also be configured to determine a high crash user group comprising a set of users that experience frequent application crashing due to a particular application feature. The user crash management module 102 can be further configured to disable the particular application feature for the high crash user group. The user crash management module 102 can also be configured to periodically rotate users in and out of the high crash user group so as to keep the high crash user group updated with users who experience frequent crashing.

As shown in the example of FIG. 1, the user crash management module 102 can include an application crash analysis module 104 and a high crash user group management module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The application crash analysis module 104 can be configured to track and analyze application data to determine users that experience application crashing most often. The application data can include information about past application crashes, such as crash cause data which identifies an application feature that caused the application to crash. For example, data can be kept on how often a user's application crashed due to a particular application feature. Users can be ranked based on the number of application crashes they experience over a particular period of time. For example, users can be ranked based on the number of crashes they have experienced in the previous thirty days, or sixty days. Users can be assigned to a high crash user group such that users who experience the most crashes are placed into the high crash user group. In certain embodiments, the ranked list of users can be filtered such that only users satisfying various filtering criteria are include in the high crash user group. In certain embodiments, users are ranked and filtered and placed into a high crash user group based on how often they experience crashing due to a particular application feature. For example, members of the high crash user group may comprise those users who have experienced the highest number of crashes over the previous thirty day period due to an in-app browser feature. The application crash analysis module 104 is discussed in greater detail herein.

The high crash user group management module 106 can be configured to manage a high crash user group. As previously discussed, the high crash user group can comprise users who have experienced frequent crashing due to a particular application feature. The high crash user group management module 106 can be configured to disable or remove the particular application feature for those users in the high crash user group. For example, if an in-app browser feature is causing users' applications to crash, the in-app browser feature can be disabled such that web content viewed in the social networking application is viewed on an external browser rather than the in-app browser. The high crash user group management module 106 can also be configured to periodically rotate users into and out of the high crash user group so that the high crash user group is updated with a current set of users who experience the most frequent crashes. In certain embodiments, the high crash user group management module 106 can be configured to select a random subset of users in the high crash user group to remove from the high crash user group. The random subset of users that is removed from the high crash user group can be replaced with an equal number of users not currently in the high crash user group who experience a high number of crashes. For example, the high crash user group management module 106 can be configured to remove ten random users from the high crash user group on a daily basis, and to replace those ten users with the ten top-ranked users in number of crashes over the previous thirty day period who are not currently in the high crash user group.

The high crash user group management module 106 is discussed in greater detail herein.

The user crash management module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the user crash management module 102 can be implemented, in part or in whole, as software running on one or more computing devices or systems, such as on a server computing system or a user (or client) computing system. For example, the user crash management module 102 or at least a portion thereof can be implemented as or within an application (e.g., app), a program, or an applet, etc., running on a user computing device or a client computing system, such as the user device 610 of FIG. 6. In another example, the user crash management module 102 or at least a portion thereof can be implemented using one or more computing devices or systems that include one or more servers, such as network servers or cloud servers. In some instances, the user crash management module 102 can, in part or in whole, be implemented within or configured to operate in conjunction with a social networking system (or service), such as the social networking system 630 of FIG. 6. It should be understood that there can be many variations or other possibilities.

The user crash management module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the user crash management module 102. For example, the data store 110 can store historical application data including crash frequency and associated causes of crashing, and information identifying a high crash user group. It is contemplated that there can be many variations or other possibilities.

Figure 2:
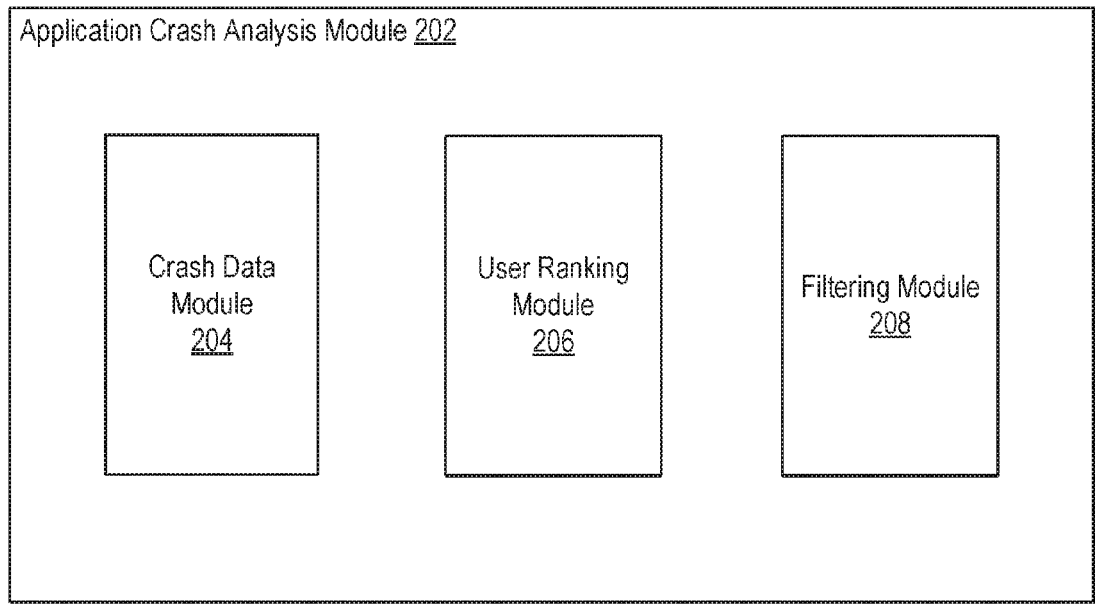
FIG. 2 illustrates an example application crash analysis module, according to an embodiment of the present disclosure.

FIG. 2 illustrates an example application crash analysis module 202 configured to analyze application crash data and to group a subset of users into a high crash user group based on the application crash data, according to an embodiment of the present disclosure. In some embodiments, the application crash analysis module 104 of FIG. 1 can be implemented as the example application crash analysis module 202. As shown in FIG. 2, the application crash analysis module 202 can include a crash data module 204, a user ranking module 206, and a filtering module 208.

The crash data module 204 can be configured to collect application data. In various embodiments, the application data can include the time of a crash (e.g., date and/or time), a user associated with the crash (e.g., the user logged into the application during the crash), and crash cause data (e.g., data identifying a particular application feature that caused the application to crash). Application data can be used to rank and filter users based on the various application data, as discussed in greater detail below.

The user ranking module 206 can be configured to rank users based on various ranking criteria. In various embodiments, users can be ranked based on application data. For example, users can be ranked based on the number of crashes they have experienced over a particular time period. In a more particular example, users can be ranked based on the number of crashes experienced in the previous thirty days, or the previous sixty days. The ranked list of users can be utilized to determine a group of high crash users to be placed in a high crash user group.

The filtering module 208 can be configured to filter users and/or application data based on various filtering criteria. In various embodiments, application data can be filtered based on crash cause data. For example, as discussed above, the crash data module 204 can keep application data, including crash cause data, e.g., a particular application feature that caused the application to crash. The application data can be filtered such that only crashes caused by a particular application feature are considered. For example, only crashes caused by an in-app browser feature can be considered. The user ranking module 206 can then rank users based on how often they have experienced crashes due to the in-app browser feature.

The filtering module 208 can also be configured to filter users based on various user filtering criteria to determine which users are to be included in a high crash user group. For example, the filtering module 208 can implement a crash threshold such that only users who have experienced a threshold number of crashes over a particular period of time can be included in the high crash user group. In certain embodiments, the filtering module 208 can also implement a ranking threshold such that only users above a ranking threshold can be included in the high crash user group. In effect, the ranking threshold can be utilized to define the size of the high crash user group, e.g., if the ranking threshold is the top fifty users, then the top fifty users in a ranked list are included in the high crash user group, thereby defining the size of the high crash user group. In various embodiments, the size of the high crash user group can be a predetermined number of users. In various embodiments, the size of the high crash user group can be defined as a percentage of an overall user population, e.g., 1% or 2% of the overall user population.

Figure 3:
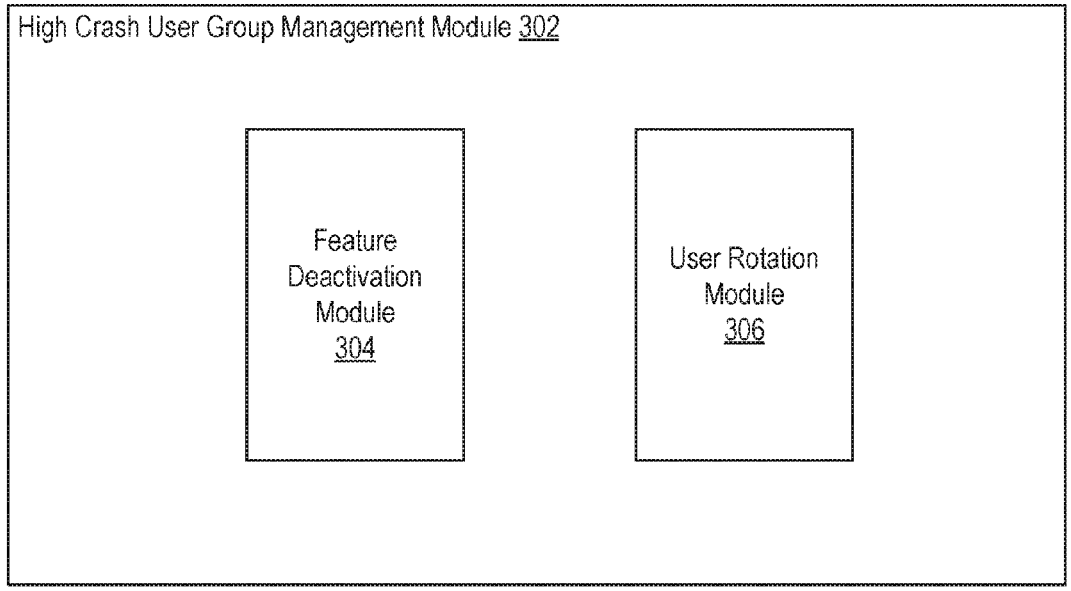
FIG. 3 illustrates an example high crash user group management module, according to an embodiment of the present disclosure.

FIG. 3 illustrates an example high crash user group management module 302 configured to manage a high crash user group, according to an embodiment of the present disclosure. In some embodiments, the high crash user group management module 106 of FIG. 1 can be implemented as the example high crash user group management module 302. As shown in FIG. 3, the high crash user group management module 302 can include a feature deactivation module 304 and a user rotation module 306.

The feature deactivation module 304 can be configured to disable or deactivate one or more features that are determined to be a common cause of crashes for the users in the high crash user group. For example, as discussed above, a high crash user group can be defined for a group of users who experience a high number of application crashes due to an in-app browser feature of a social networking application. In this case, the feature deactivation module 304 can be configured to disable the in-app browser for users in the high crash user group. In certain embodiments, when the in-app browser feature is activated, third party web content accessed from within an application is viewed using an in-app browser. When the in-app browser is disabled, an external browser is used to view third party web content that a user has selected for viewing within the application.

The user rotation module 306 can be configured to periodically rotate users into and out of the high crash user group. Rotation of users into and out of the high crash user group allows for updates to the high crash user group based on changing circumstances. For example, certain users who had previously experienced frequent crashing may no longer have that problem because they changed their data carrier, or their mobile device, etc.

Periodic removal of users from the high crash user group ensures that users who no longer need to be included in the high crash user group have an opportunity to be removed such that any disabled application features can be re-activated. Applications generally include features that an application provider believes will be beneficial in some way. For example, an in-app browser feature in a social networking application can be beneficial in that it allows users to view external web content without leaving the social networking application, thereby increasing user convenience and improving chances of continued user engagement. As such, disabling an application feature is generally a disfavored state that should only be enacted if necessary to avoid a bad user experience, e.g., if the feature causes frequent crashing of the application. However, once a user is added to the high crash user group, and the troublesome feature is disabled or removed, there is little way of knowing whether the disabled feature would continue to cause crashes if it was reactivated. In order to address this problem, a subset of users from the high crash user group can be periodically be removed, and any disabled features can be reactivated to see whether the removed users' applications continue to crash. In various embodiments, a predefined number of users in the high crash user group, or a predefined percentage of the high crash user group, can be removed periodically, e.g., daily, weekly, or monthly. In certain embodiments, selection of users for removal from the high crash user group is performed randomly. For example, 3% of a high crash user group can be randomly selected for removal every day.

Similarly, periodic addition of users to the high crash user group allows users who may be experiencing application crashes due to a particular feature to be moved into the high crash user group. For example, all users who are not in the high crash user group may continue to be ranked or re-ranked based on application data, e.g., ranked based on the number of crashes caused by an in-app browser feature over the previous thirty days. The highest ranking users can be moved into the high crash user group to replace the users who have been removed from the high crash user group. In various embodiments, the number of users who are moved into the high crash user group is equal to the number of users who are removed from the high crash user group, such that the size of the high crash user group remains constant. For example, if three people of a hundred-person high crash user group are randomly selected for removal every day, the top three ranked users that are currently not in the high crash user group can be moved into the high crash user group. These new users would then have the troublesome feature (e.g., the in-app browser) disabled, resulting in fewer crashes and a better user experience.

In various embodiments, users can only be removed from the high crash user group if they have been in the high crash user group for a minimum period of time. Similarly, users can only be added to the high crash user group if they have been outside the high crash user group for a minimum period of time, e.g., thirty days. Implementing this minimum time requirement ensures that a user's application experience is not changing too frequently based on constant disabling and reactivation of a feature as the user is moved into and out of the high crash user group. The minimum time requirement ensures that users will have a consistent experience for at least the defined minimum period of time, e.g., thirty days or sixty days. In these embodiments, users who have not been in the high crash user group for the minimum period of time may be excluded from the random selection of users to be removed from the high crash user group. Similarly, users who have not been outside the high crash user group for the minimum period of time may be excluded from moving into the high crash user group, even if the user is ranked highly and/or satisfies a ranking requirement. In certain embodiments, users who do not satisfy the minimum time requirement may be excluded from being included in the ranking altogether.

Figure 4:
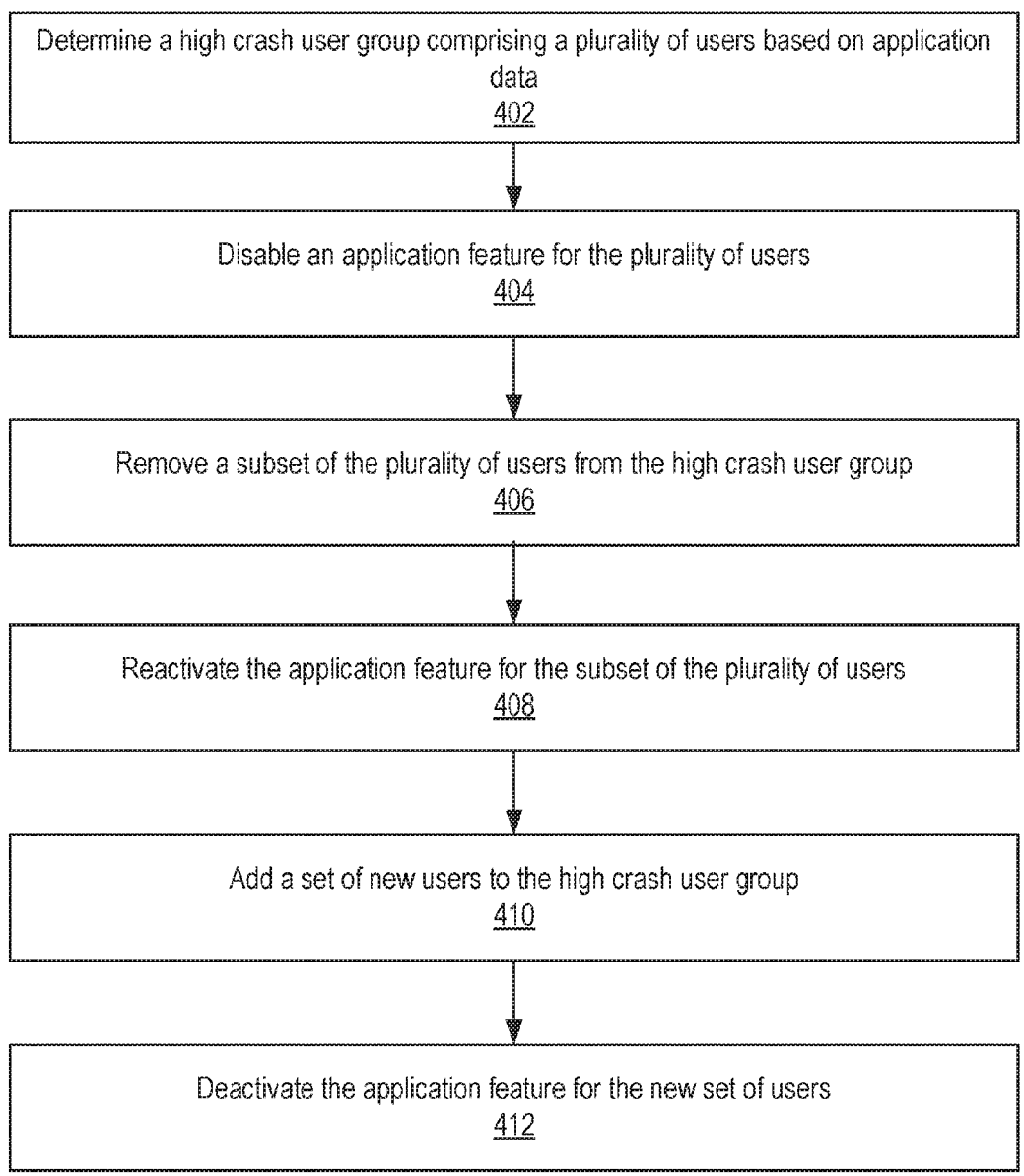
FIG. 4 illustrates an example method for user application crash management, according to an embodiment of the present disclosure.

FIG. 4 illustrates an example method 400 associated with user application crash management, according to an embodiment of the present disclosure. It should be appreciated that there can be additional, fewer, or alternative steps performed in similar or alternative orders, or in parallel, based on the various features and embodiments discussed herein unless otherwise stated.

At block 402, the example method 400 can determine a high crash user group comprising a plurality of users based on application data. At block 404, the example method 400 can disable an application feature for the plurality of users. At block 406, the example method 400 can remove a subset of the plurality of users from the high crash user group. At block 408, the example method 400 can reactivate the application feature for the subset of the plurality of users. At block 410, the example method 400 can add a set of new users to the high crash user group. At block 412, the example method 400 can deactivate the application feature for the set of new users. Other suitable techniques that incorporate various features and embodiments of the present technology are possible.

Figure 5:
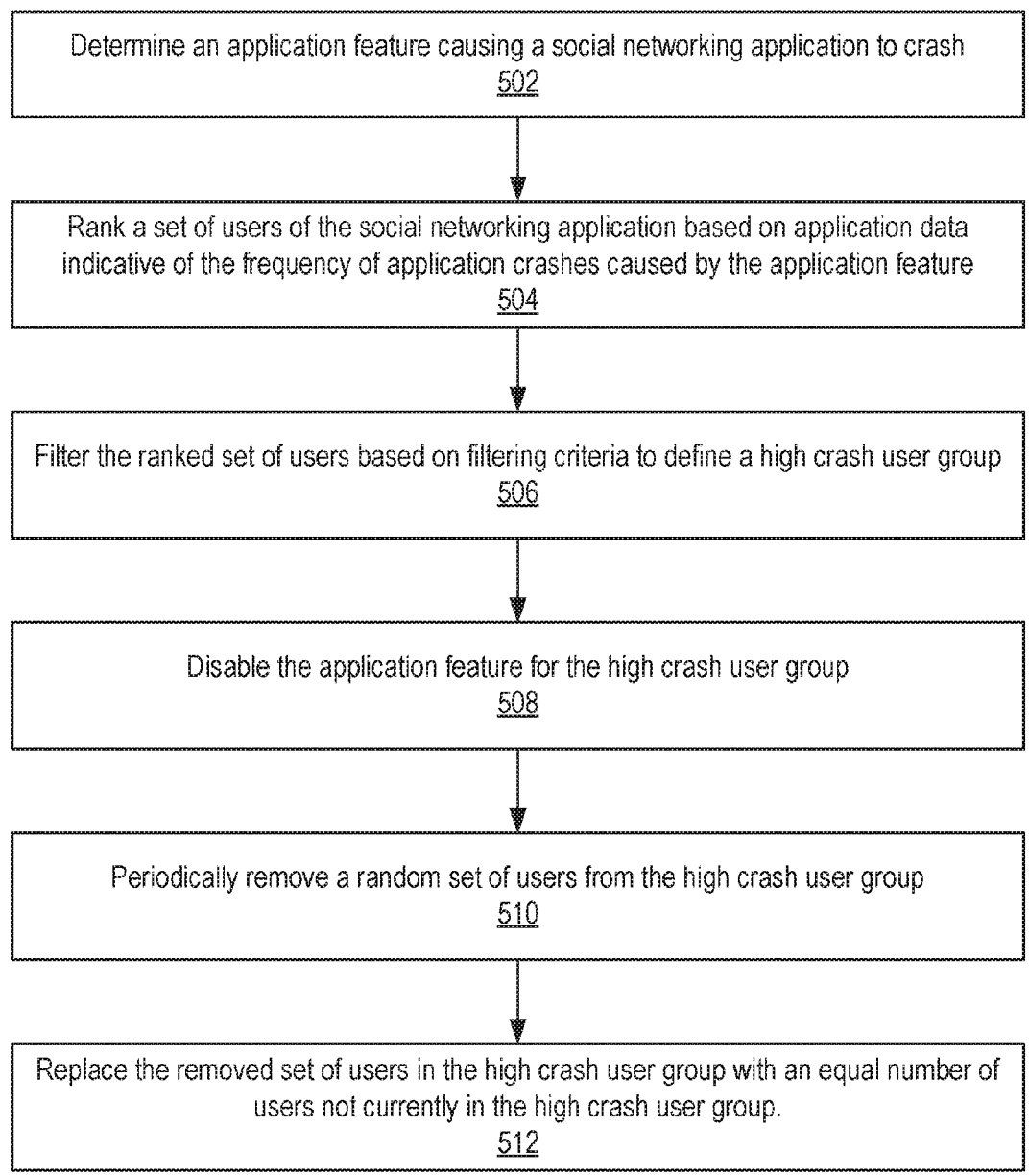
FIG. 5 illustrates another example method for user application crash management, according to an embodiment of the present disclosure.

FIG. 5 illustrates another example method 500 associated with user application crash management, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can determine an application feature causing a social networking application to crash. At block 504, the example method 500 can rank a set of users of the social networking application based on application data indicative of the frequency of application crashes caused by the application feature. At block 506, the example method 500 can filter the ranked set of users based on filtering criteria to define a high crash user group. At block 508, the example method 500 can disable the application feature for the high crash user group. At block 510, the example method 500 can periodically remove a random set of users from the high crash user group. At block 512, the example method 500 can replace the removed set of users in the high crash user group with an equal number of users not currently in the high crash user group. Other suitable techniques that incorporate various features and embodiments of the present technology are possible.

Social Networking System—Example Implementation

Figure 6:
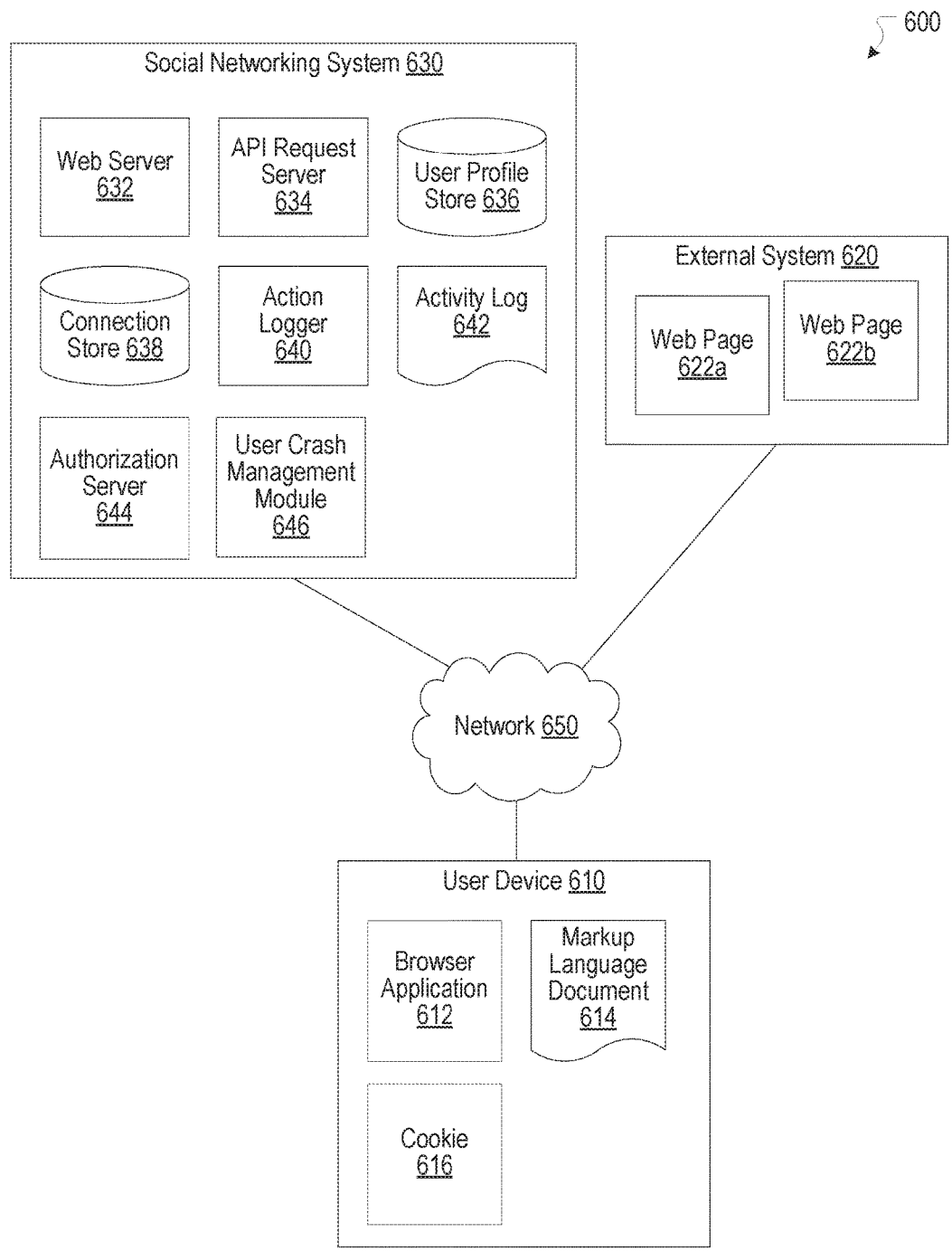
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity ™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620.

In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a user crash management module 646. The user crash management module 646 can, for example, be implemented as the user crash management module 102, as discussed in more detail herein. As discussed previously, it should be appreciated that there can be many variations or other possibilities. For example, in some embodiments, one or more functionalities of the user crash management module 646 can be implemented in the user device 610.

Hardware Implementation

Figure 7:
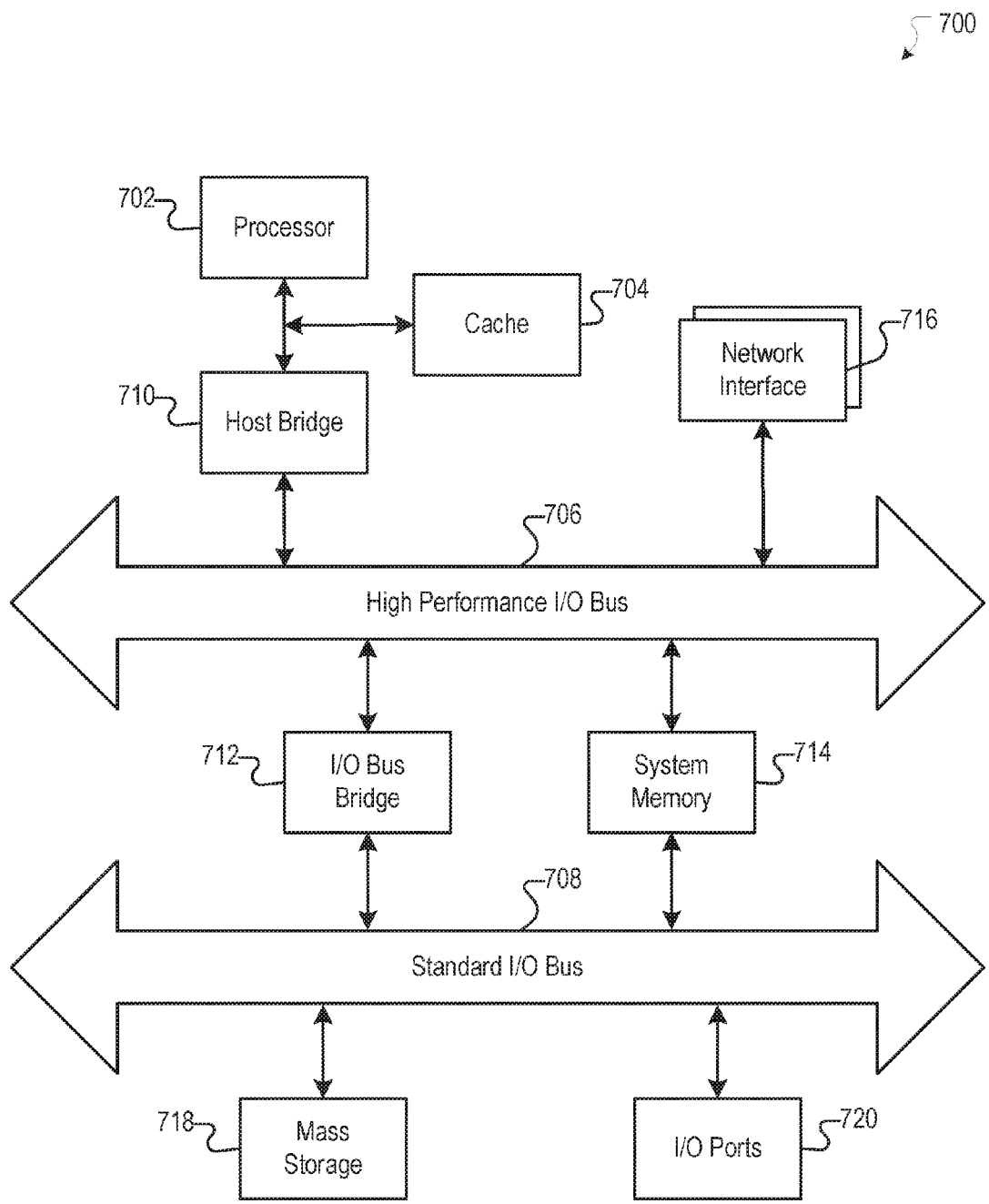
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Cali., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, an application feature causing an application to crash;
   ranking, by the computing system, a set of users based on application data, the application data comprising crash cause data indicative of the number of times the application feature caused the application to crash for a user;

determining, by the computing system, a high crash user group based on the ranking the set of users;

disabling, by the computing system, the application feature for the high crash user group; and periodically replacing, by the computing system, a subset of the high crash user group with a set of new users not currently in the high crash user group.

2. The computer-implemented method of claim 1, wherein the subset of the high crash user group is randomly selected.

3. The computer-implemented method of claim 1, wherein the set of new users is equal in number to the subset of the high crash group.

4. The computer-implemented method of claim 1, further comprising re-ranking an updated set of users that are not in the high crash user group based on application data,
wherein the set of new users is selected based on the re-ranking the updated set of users.

5. The computer-implemented method of claim 1, wherein a user cannot be removed from the high crash user group if the user has not been in the high crash user group for a minimum period of time.

6. The computer-implemented method of claim 1, wherein a user cannot be added to the high crash user group if the user has not been outside the high crash user group for a minimum period of time.

7. The computer-implemented method of claim 1, wherein the crash cause data is indicative of the number of times the application feature caused the application to crash for a user over a predetermined period of time.

8. The computer-implemented method of claim 1, wherein the size of the high crash user group is defined by a percentage of an overall user population.

9. The computer-implemented method of claim 1, wherein the application feature is an in-app browser.

10. The computer-implemented method of claim 1, wherein deactivating the in-app browser comprises causing web content to be opened in an external browser.

11. A system comprising:
at least one processor; and
a memory storing instructions that, when executed by the at least one processor, cause the system to perform a method comprising:
determining an application feature causing an application to crash;
ranking a set of users based on application data, the application data comprising crash cause data indicative of the number of times the application feature caused the application to crash for a user;
determining a high crash user group based on the ranking the set of users;
disabling the application feature for the high crash user group; and
periodically replacing a subset of the high crash user group with a set of new users not currently in the high crash user group.

12. The system of claim 11, wherein the subset of the high crash user group is randomly selected.

13. The system of claim 11, wherein the set of new users is equal in number to the subset of the high crash group.

14. The system of claim 11, wherein
the method further comprises re-ranking an updated set of users that are not in the high crash user group based on application data, and
the set of new users is selected based on the re-ranking the updated set of users.

15. The system of claim 11, wherein a user cannot be removed from the high crash user group if the user has not been in the high crash user group for a minimum period of time.

16. A non-transitory computer-readable storage medium including instructions that, when executed by at least one processor of a computing system, cause the computing system to perform a method comprising:
determining an application feature causing an application to crash;
ranking a set of users based on application data, the application data comprising crash cause data indicative of the number of times the application feature caused the application to crash for a user;
determining a high crash user group based on the ranking the set of users;
disabling the application feature for the high crash user group; and
periodically replacing a subset of the high crash user group with a set of new users not currently in the high crash user group.

17. The non-transitory computer-readable storage medium of claim 16, wherein the subset of the high crash user group is randomly selected.

18. The non-transitory computer-readable storage medium of claim 16, wherein the set of new users is equal in number to the subset of the high crash group.

19. The non-transitory computer-readable storage medium of claim 16, wherein
the method further comprises re-ranking an updated set of users that are not in the high crash user group based on application data, and
the set of new users is selected based on the re-ranking the updated set of users.

20. The non-transitory computer-readable storage medium of claim 16, wherein a user cannot be removed from the high crash user group if the user has not been in the high crash user group for a minimum period of time.

* * * * *